Aug. 16, 1932.  P. P. BARTHELEMY  1,872,222
CAR AXLE POTECTOR
Filed Oct. 16, 1931
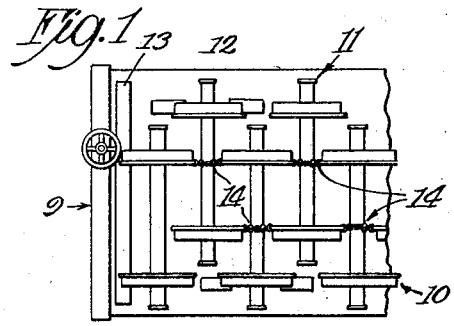
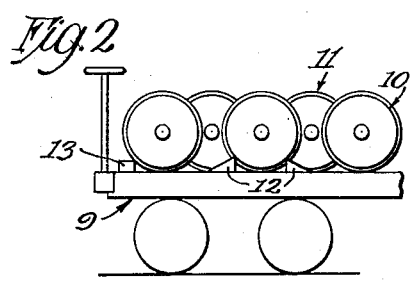
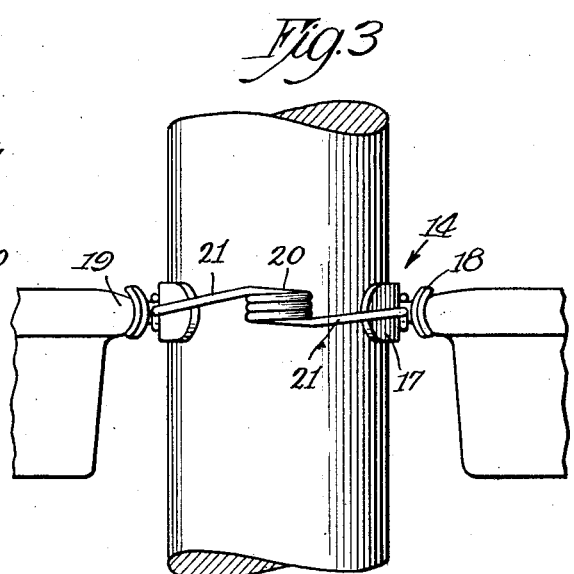
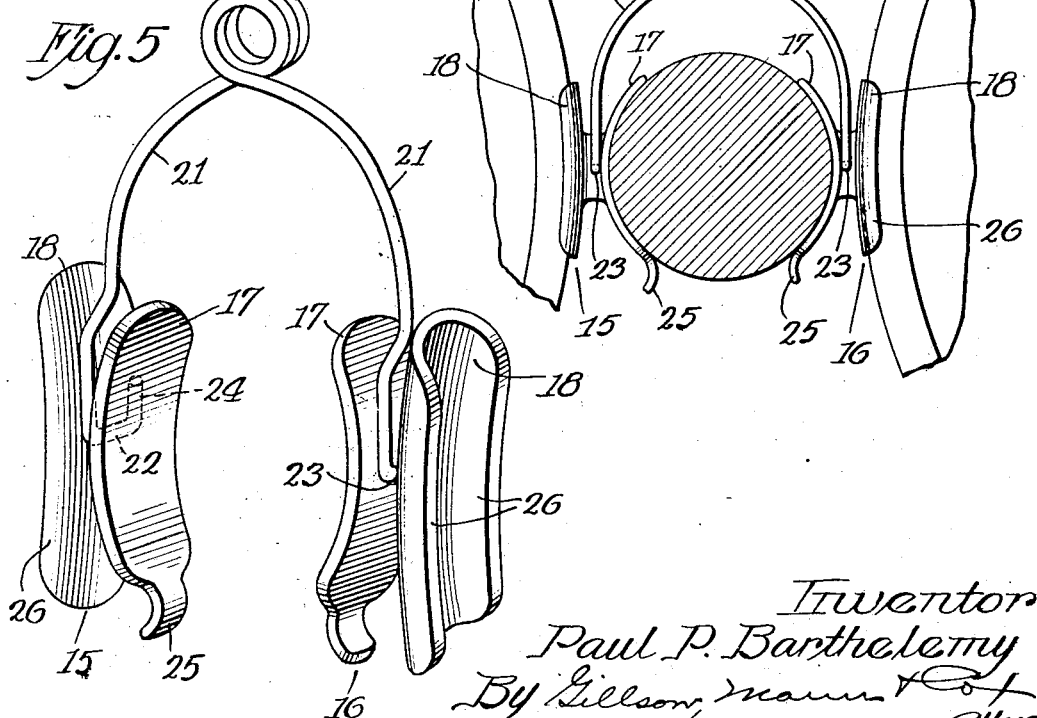
Inventor
Paul P. Barthelemy
By Gilson, ...
Attys.

Patented Aug. 16, 1932

1,872,222

UNITED STATES PATENT OFFICE

PAUL P. BARTHELEMY, OF ST. PAUL, MINNESOTA, ASSIGNOR TO UNIVERSAL DRAFT GEAR ATTACHMENT COMPANY, A CORPORATION OF ILLINOIS

CAR AXLE PROTECTOR

Application filed October 16, 1931. Serial No. 569,278.

This invention relates to a device for protecting car axles against damage from adjacent car wheels when mounted wheels are being shipped from one place to another.

Further and other objects and advantages will become apparent as the disclosure proceeds and the description is read in conjunction with the accompanying drawing, in which Fig. 1 is a fragmentary plan view of a flat car loaded with mounted wheels according to standard practice, the car axle protector of the present invention being shown applied to the axles;

Fig. 2 is a side elevational view of Fig. 1;

Fig. 3 is an enlarged plan view of a car axle flanked on each side with car wheels, the flanges of which are held away from the axle by the car axle protector of this invention;

Fig. 4 is a side, elevational view of Fig. 3; and

Fig. 5 is a perspective view of the axle protector.

An approved method of loading mounted wheels on freight cars is shown in Figs. 1 and 2 where alternate pairs of wheels are arranged in staggered relation and are held in place by angular chocks associated with alternate outside wheels on both sides of the car.

Prior to the adoption of the present invention in loading mounted wheels for shipment, it has been an altogether too common experience for car axles to be badly damaged in transit by the impacts and rubbing of adjacent car wheels, many times to such an extent that the axles are necessarily rejected as unsafe.

Referring to Figs. 1 and 2, there is shown a flat car generally indicated at 9 upon which two series 10 and 11 of mounted wheels are loaded. Alternate outside wheels of each series are blocked with angular chocks 12 and a block 13 extends transversely of the car at each end.

The loading method above described represents practice which is approved by the American Railway Association. However since chock blocks do not provide firm and rigid anchorage for the wheels, it will be seen that buff and draft shocks will cause the inner car wheels to strike against the adjacent car axles and if the contact is sufficient, grooves will be worn in the car axles.

To remedy this situation, a car axle protector, generally designated 14, is clamped to the car axle in alinement with the adjacent car wheel flanges.

The protector comprises a pair of identical castings 15 and 16, preferably formed of malleable iron. The castings include a plate 17 whose interior surface is rounded to conform to the car axle. Integrally joined with the plate 17 is a channeled member 18 having an inner radius of curvature corresponding to the radius of the adjacent car wheel flange 19. The two castings or shoes are normally held together by a helical spring 20, the ends of which are bowed at 21 and then bent at 22 where they pass through suitable apertures 23 provided in the respective shoes. The ends of the spring 20, after being passed through the apertures 23, are bent over at 24 to hold the spring in place.

The protector is applied to the axle by slipping the two shoes downwardly over the axle and to facilitate this operation, the lower ends of the plate 17 are provided with outwardly curved lips 25.

The walls 26 of the member 18 have sufficient depth to prevent the car wheel flanges 19 from becoming disengaged from the shoe by lateral shifting of the mounted wheels. It will also be noted that rotation of the axle upon which the protector is mounted will not carry with it the protector, since the curvature of the member 18 is not concentric with the axle carrying the protector.

The device above described is very inexpensive to manufacture, especially since the two shoes 15 and 16 are identical. It can be quickly applied to a car axle during the loading of the wheels, and will insure the axles against damage in transit.

Obviously, the invention may be embodied in other forms within the scope of the appended claims.

What I claim is:

1. In a device of the class described, a pair of shoes having their interior surfaces rounded to receive a car axle and their exterior surfaces curved and channeled to receive adjacent wheel flanges, and a helical spring having its two extremities joined to the shoes and tending to force them together.

2. In a device of the class described, a pair of castings having their interior surfaces rounded to receive a car axle and their exterior surfaces curved and channeled to receive adjacent wheel flanges, and resilient means for clamping the castings on a car axle.

3. A device for protecting car axles against damage from adjacent wheel flanges when mounted wheels are being shipped, including a protective shoe adapted to be normally held in place between the car axle and an adjacent wheel flange.

4. In a device of the class described, a pair of shoes having their interior surfaces rounded to receive a car axle and their exterior surfaces curved and channeled to receive adjacent wheel flanges, a helical spring having its two extremities joined to the shoes and tending to force them together, and outwardly curved lips on the shoes to facilitate clamping the device to the car axle.

5. In a device of the class described, a pair of shoes adapted to be clamped to a car axle, each shoe being engageable with an adjacent car wheel flange, and means for preventing rotation of the shoe on the axle when the mounted wheels are in normal shipping position.

6. In a device of the class described, a pair of shoes adapted to be clamped to a car axle, each shoe being engageable with an adjacent car wheel flange, and means for preventing lateral movement of the car wheels out of engagement with the shoes.

In testimony whereof I affix my signature.

PAUL P. BARTHELEMY.